No. 878,602. PATENTED FEB. 11, 1908.
L. A. BIGGAR.
SPLIT SHEET METAL PULLEY.
APPLICATION FILED JULY 5, 1907.
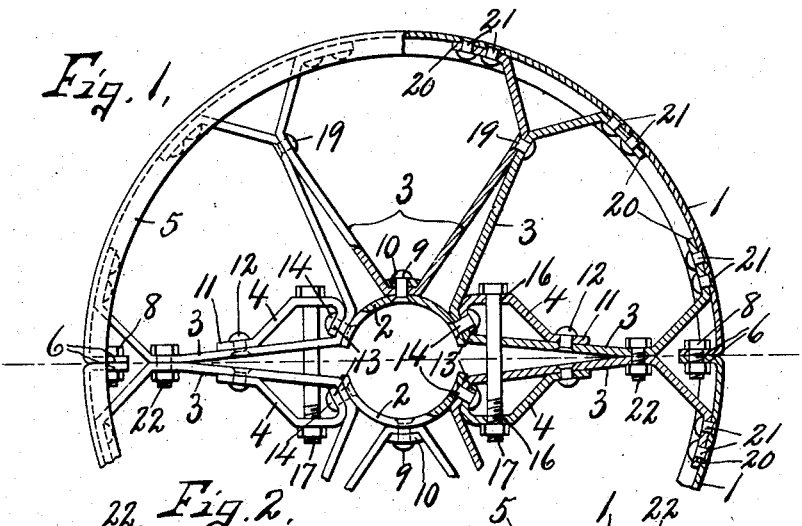
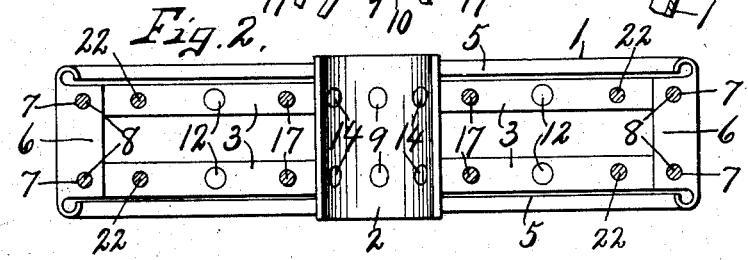
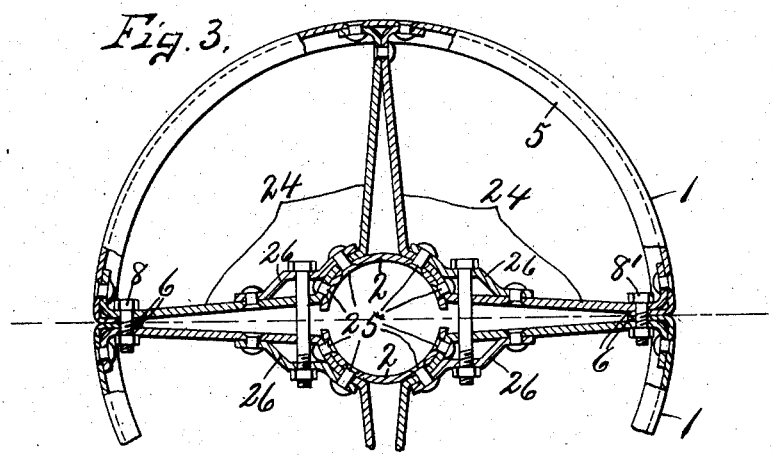
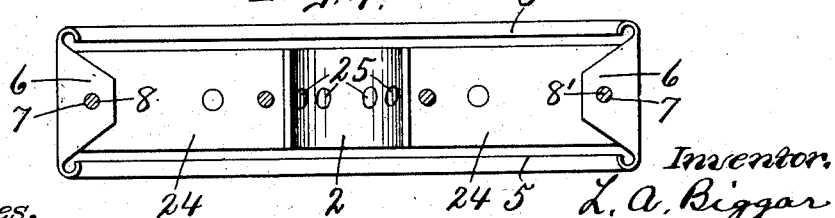
Witnesses.
Inventor.
L. A. Biggar
By Howard P. Denison
Attorney.

UNITED STATES PATENT OFFICE.

LEROY AYRES BIGGAR, OF ONEIDA, NEW YORK.

SPLIT SHEET-METAL PULLEY.

No. 878,602.        Specification of Letters Patent.        Patented Feb. 11, 1908.

Application filed July 5, 1907. Serial No. 382,334.

*To all whom it may concern:*

Be it known that I, LEROY AYRES BIGGAR, of Oneida, in the county of Madison, in the State of New York, have invented new and useful Improvements in Split Sheet-Metal Pulleys, of which the following, taken in connection with the accompanying drawings, is a full, clear, and exact description.

This invention relates to certain improvements in split sheet metal pulleys, the essential objects of which are lightness, economy in manufacture, and durability. In this class of pulleys sheet metal spokes are employed to unite the rim to the hub, and one of the specific objects of my present invention is to provide reinforcing elements at the junction of the spokes with the hub, and also to brace the meeting edges of the rim against radial compression, the outer ends of the spokes being also arranged to brace the rim in such manner as to relieve in a measure, direct radial compression or end-thrust strains upon the spokes.

In the drawings—Figure 1 is a side elevation, partly in section, of a portion of a split pulley embodying the various features of my invention. Fig. 2 is an inner face view of one form of the pulley. Fig. 3 is a side view, partly in section, of a portion of a modified form of pulley, as used for smaller sizes. Fig. 4 is an inner face view of one-half of the pulley seen in Fig. 3.

This pulley comprises essentially opposite half rim sections —1,— a split hub —2— divided in the plane of the meeting edges of the rim section —1— and spoke-arms —3— of sheet metal which are reinforced at the junction with the hub by specific brace-bars —4.

Each rim section —1— preferably consists of a semi-circular sheet metal plate of any desired face width and having its opposite longitudinal edges rolled or turned inwardly forming reinforcing flanges —5— to stiffen the rim against undue bucking, and also serving to maintain the semi-circular form of the rim.

The opposite ends of each rim section are bent inwardly toward each other in the plane of the meeting edges of the sections forming flat radial flanges —6— having apertures —7— for receiving suitable clamping bolts —8—, whereby the meeting ends of the rim sections may be clamped together.

The spoke-arms —3— preferably consist of V-shape sheet metal bars having their apexes flattened or truncated and secured to the hub section by rivets —9—, together with suitable transverse reinforcing bars —10— which fit in the apexes of the arms —3— and are fastened in place by the rivets —9—
for the purpose of reinforcing the spoke-arms at their junctions with the hub.

The apex of the V-shape spoke-arms —3— is preferably concavo convex and of greater width circumferentially than the diameter of the bolts or rivets —9— so as to afford as broad a bearing as possible upon the periphery of the hub while the reinforcing plates —10— are made to conform to the angle between the arms —3— in which angle they closely fit so as to stiffen the corners at the apex of the spoke arms, and at the same time, relieve in a measure, shearing strains upon the bolts —9—.

In the pulley shown in Fig. 1, each half section is provided with a series of, in this instance, three V-shape spoke-arms, one at the center being secured to the hub in the manner just described by the rivets —9—, while the others are of substantially the same construction, but are reinforced at their junction with the hub section by the braces —4—.

The spoke-arms —3— nearest the meeting edges of the pulley section are disposed at an angle with the plane of said meeting edges, while the braces —4— which are secured to the diametrically opposite spoke-arms at the meeting faces of the pulley are provided with outwardly extending flanges —11— resting upon and secured to the adjacent spoke-arm —3— by rivets —12— while the inner ends of said brace-bars —4— are provided with flanges 13— resting in the apexes of the spoke-arms —3— and secured thereto and to the hub by rivets —14—.

As shown in Fig. 1, the inner ends of the brace-bars —4— are turned inwardly toward the meeting faces of the pulley sections and the intermediate portions of said brace-bars are spaced apart some distance from the adjacent spoke-arm —3— at such meeting edges leaving an intervening space between the brace-bar and adjacent spoke-arm, a part of said intermediate portion of the brace bar being substantially parallel with the meeting faces of the pulley sections, and provided with an aperture —16— for receiving clamping bolt —17— by which the pulley sections are clamped to the shaft, not shown, the object of making certain parts of the intermediate portions of the brace-bars —4— parallel being to afford suitable bearings for the heads and nuts of the clamping bolts —17— so that in tightening the bolts the line of draft would be at substantially right angles with said meeting faces of the pulley sections.

The adjacent sides of the V-shape spoke-arms converge outwardly from the hub toward each other and are secured together intermediate their ends by rivets —19—, their outer ends being divergent and provided with flanges —20— which fit against the inner side of and are secured to the rim by rivets 21, as best seen in Fig. 1.

The arms —3— at the meeting edges of the pulley sections are secured together by clamping bolts —22—, which together with the clamping bolts —8— and 17—, are readily removable to permit the pulley sections to be separated.

The pulley shown in Figs. 3 and 4 has substantially the same elements as shown in Figs. 1 and 2, but is adapted for the smaller sizes; that is, each half section of the rim is united to the corresponding hub section by a series of in this instance, two V-shape spoke-arms —24—, the apexes of which are also concavo convex, but somewhat wider than those shown in Fig. 1 and are seated upon the periphery of the hub section —2— and secured thereto by rivets —25—.

The spoke-arms —24— are reinforced at their junction with the hub sections by braces —26— which are similar to the braces —4—, except that the flanges which are fitted in the apexes of the spoke-arms are turned outwardly instead of inwardly and are secured in place by the rivets —25—.

A further difference of construction shown in Fig. 3 over that shown in Fig. 1 is that the spoke-arms at the meeting edges of the pulley sections rest against and are clamped to the inturned flanges —6 by clamping bolts 8'—, or in other words, the inturned flanges —6— at the meeting edges are clamped between the outer ends of the spoke-arms adjacent to the meeting faces of the pulley sections.

The object in spacing the intermediate portions of the braces —4— and —26 apart from the adjacent portions of the spoke-arms to which they are secured is to allow a limited resiliency of such parts under the strains to which the spokes are subjected so as to distribute such strains from the spokes more directly onto the hub, or rather over a broader area circumferentially around the hub, thereby preventing in a measure, crystallization of the parts due to vibration.

What I claim is:

1. In a split pulley, a sheet metal hub and a sheet metal rim in combination with V-shape spoke-arms having their apexes secured to the hub and their outer ends secured to the rim and braces having their inner ends seated in the apexes of the spoke-arms and their outer ends secured to the spoke-arms at the meeting faces of the split pulley.

2. A split pulley comprising a hub section and a rim section, a series of outwardly diverging spoke-arms having their inner ends united and secured to the hub section and their outer ends deflected inwardly toward each other and secured to the rim section, and brace bars in the angle of the diverging spoke-arms and secured to the hub, and to the adjacent spoke-arms.

3. In a split pulley, a sheet metal rim and a hub in combination with sheet metal spokes having their inner ends concavo convex and seated on the periphery of the hub and their outer ends deflected laterally and secured to the inner face of the rim and brace-bars having their inner ends seated upon the concave convex inner ends of the spokes and secured to the hub and their outer ends secured to the spokes, the intermediate portions of said brace bars being spaced apart from the adjacent portion of the spokes and disposed in planes substantially parallel with the meeting faces of the pulley sections, and clamping bolts passed through the intermediate portions of the brace-bars and adjacent spokes for securing the opposite pulley sections together.

In witness whereof I have hereunto set my hand this 29 day of June 1907.

LEROY AYRES BIGGAR.

Witnesses:
   CLARA B. WOOLWORTH,
   JAMES MOORE.